United States Patent
Chandnani et al.

(10) Patent No.: US 10,089,414 B2
(45) Date of Patent: Oct. 2, 2018

(54) SYSTEM ARCHITECTURE GENERATION

(75) Inventors: Ashok Chandnani, Troy, MI (US); Jeff Hager, Castle Rock, CO (US); Yvon P Queromes, Modesto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 860 days.

(21) Appl. No.: 14/395,432

(22) PCT Filed: Jul. 31, 2012

(86) PCT No.: PCT/US2012/049071
§ 371 (c)(1),
(2), (4) Date: Oct. 17, 2014

(87) PCT Pub. No.: WO2014/021876
PCT Pub. Date: Feb. 6, 2014

(65) Prior Publication Data
US 2015/0324488 A1    Nov. 12, 2015

(51) Int. Cl.
*G06F 17/50* (2006.01)
*G06Q 10/08* (2012.01)

(52) U.S. Cl.
CPC .......... *G06F 17/50* (2013.01); *G06F 17/5045* (2013.01); *G06Q 10/0875* (2013.01); *G06F 2217/02* (2013.01); *G06F 2217/86* (2013.01)

(58) Field of Classification Search
None
See application file for complete search history.

(56) References Cited

U.S. PATENT DOCUMENTS

| | | |
|---|---|---|
| 5,119,307 A | 6/1992 | Blaha et al. |
| 7,039,654 B1 | 5/2006 | Eder |
| 8,180,691 B2 | 5/2012 | Cao et al. |
| 8,190,399 B1 | 5/2012 | Anderson et al. |
| 2004/0123062 A1 | 6/2004 | Dalal et al. |
| 2005/0044197 A1 | 2/2005 | Lai |
| 2007/0016432 A1 | 1/2007 | Piggott et al. |
| 2007/0016551 A1 | 1/2007 | Bigus et al. |

(Continued)

OTHER PUBLICATIONS

A Design Flow for the Development, Characterization, and Refinement of System Level Architectural Services—Douglas Michael Densmore—Electrical Engineering and Computer Sciences University of California at Berkeley—Technical Report No. UCB/EECS-2007-59.

(Continued)

*Primary Examiner* — Syed Roni
(74) *Attorney, Agent, or Firm* — Michael A. Dryja

(57) ABSTRACT

A template corresponds to a general system architecture for providing a desired functionality. A particular system architecture for providing the desired functionality is generated based on the template and based on specifications of requirements for the particular system architecture. The particular system architecture is implementable using hardware and software that are specified and that are available to implement the general system architecture. One or more of a logical diagram of the particular system architecture, a physical diagram of the particular system architecture, and a bill of materials of the hardware and the software selected to implement the particular system architecture are provided.

20 Claims, 3 Drawing Sheets

(56) References Cited

U.S. PATENT DOCUMENTS

2007/0240154 A1  10/2007 Gerzymisch et al.
2009/0287635 A1* 11/2009 Belville .............. G06F 17/5045
2011/0161914 A1   6/2011 Xie et al.
2013/0061146 A1*  3/2013 Kirby .................... G06Q 10/06
                                                 715/738

OTHER PUBLICATIONS

EPO; European Search Report; 12882261.6-1954 I 2880552 PCT/US2012049071; dated Mar. 3 2016; 21 pages.
Rapid-Prototyping of Hardware and Software in a Unified Framework—EECS Department, University of California at Berkeley—Mani B. Srivastava/Robert W. Brodersen, 1991.
System Architecture Template; Written by: Jason D. Hintersteiner and Glenn Friedman Last updated: Apr. 22, 1999—1998, 1999 Massachusetts Institute of Technology.
"Adaptivity Design Studio: Open Data Center Edition"; Adaptivity; 5 pages, 2010.
"AIA 11gR1 Installation and Deployment—Flexibilities, Topologies, Architecture and Tools"; Oracle White Paper; Feb. 2011; 34 pages.
PTC Search Report/Written Opinion—Application No. PCT/US2012/049071; dated Feb. 22, 2013; 9 pages.

\* cited by examiner

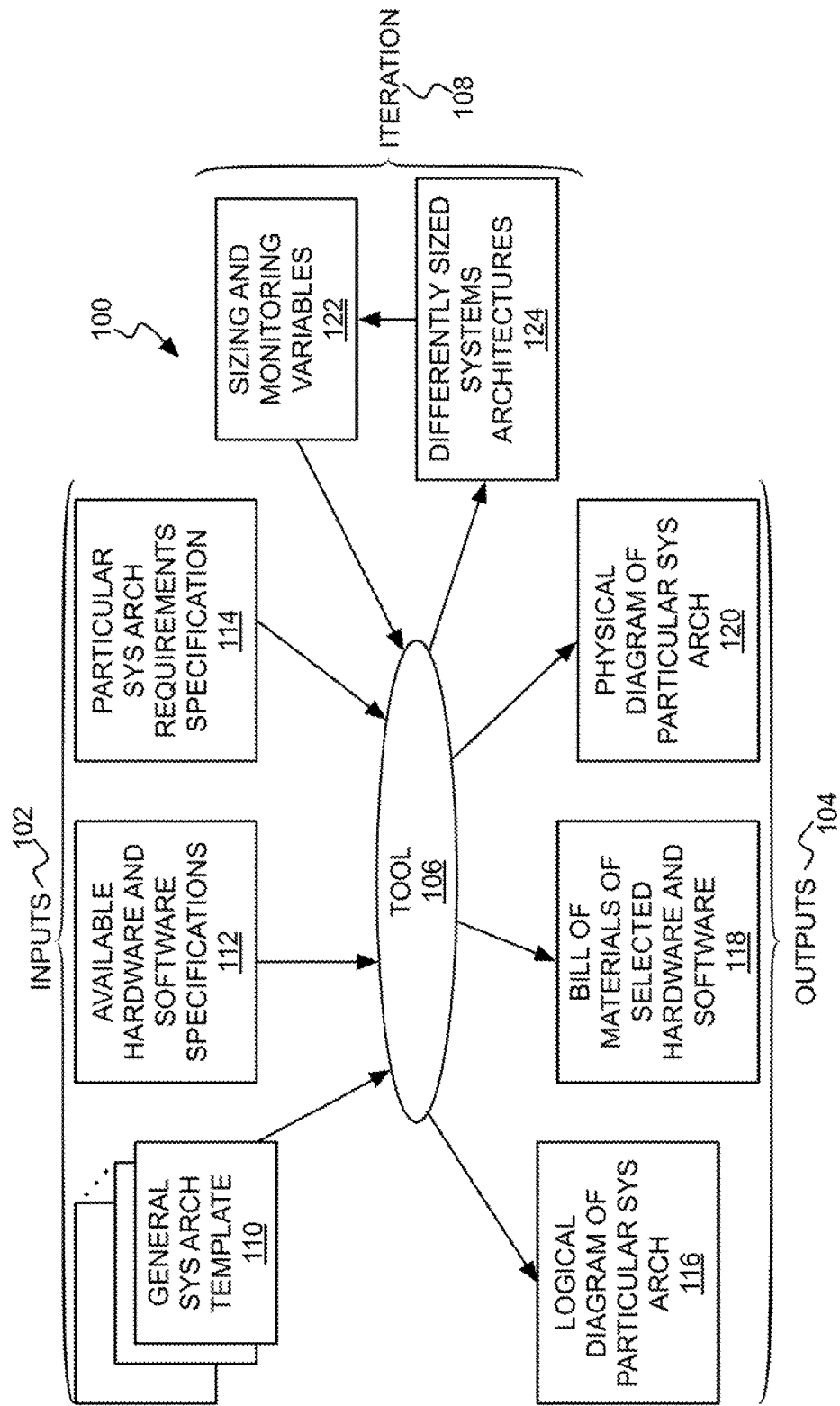

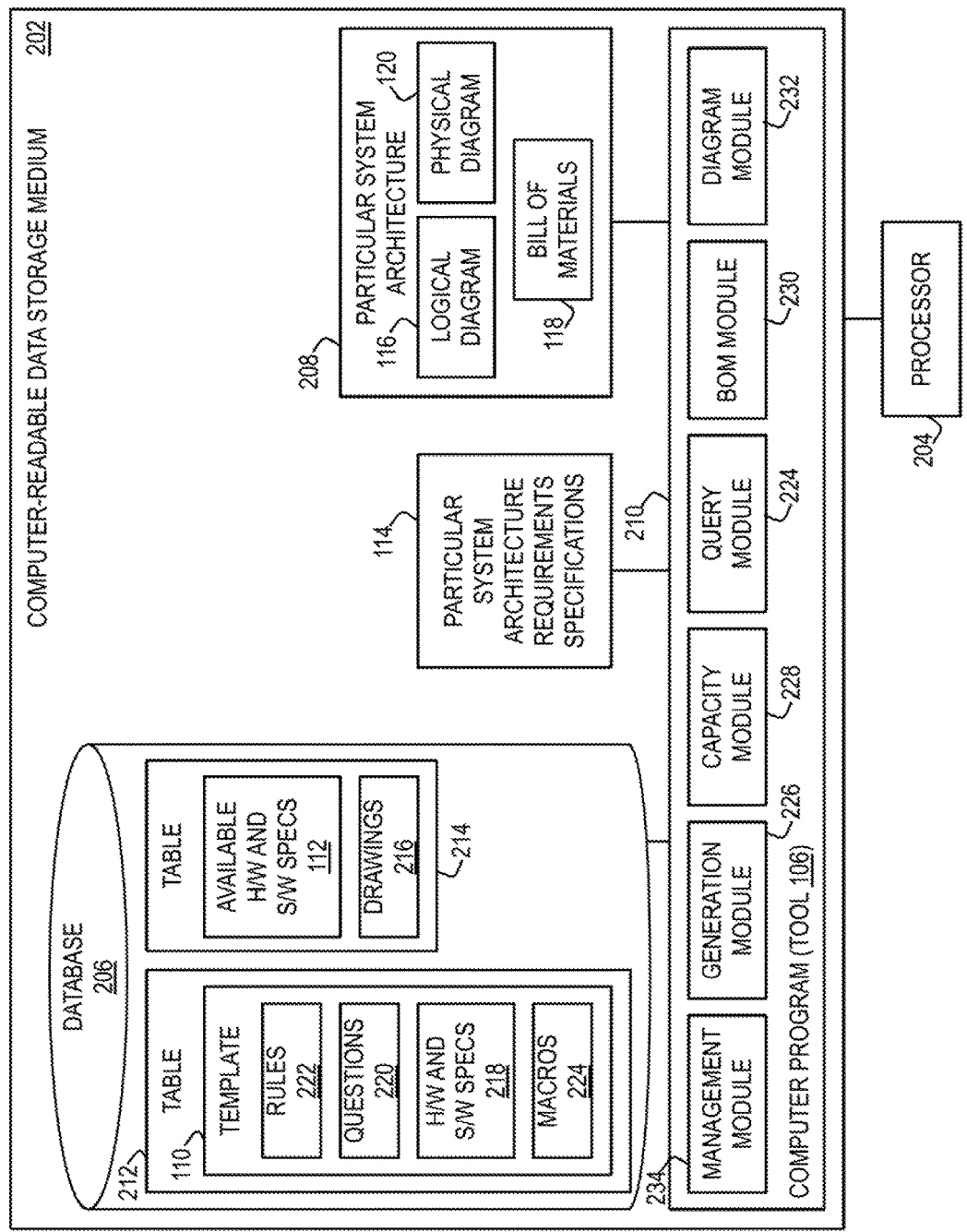

SYSTEM ARCHITECTURE GENERATION

BACKGROUND

Many types of complex computing systems are developed for wide range of different desired functionalities. Manufacturing, media, retail, and government entities use such computing systems to fulfill their needs to better satisfy their customers and to increase efficiency as well as profit in the case of business-related entities. Examples of such computing systems including digital media management systems, manufacturing systems, business analytics for marketing systems, and so on. A complex computing system is usually not constructed in a haphazard manner, but rather is designed from the ground up, by developing a particular architecture for a computing system that is then implemented using hardware and software from a single vendor or from a variety of different vendors.

BRIEF DESCRIPTION OF THE DRAWINGS

FIG. 1 is a diagram illustratively depicting an example of how a particular system architecture can be generated.

FIG. 2 is a diagram of an example computing system for generating a particular system architecture.

DETAILED DESCRIPTION

Figure 3A:
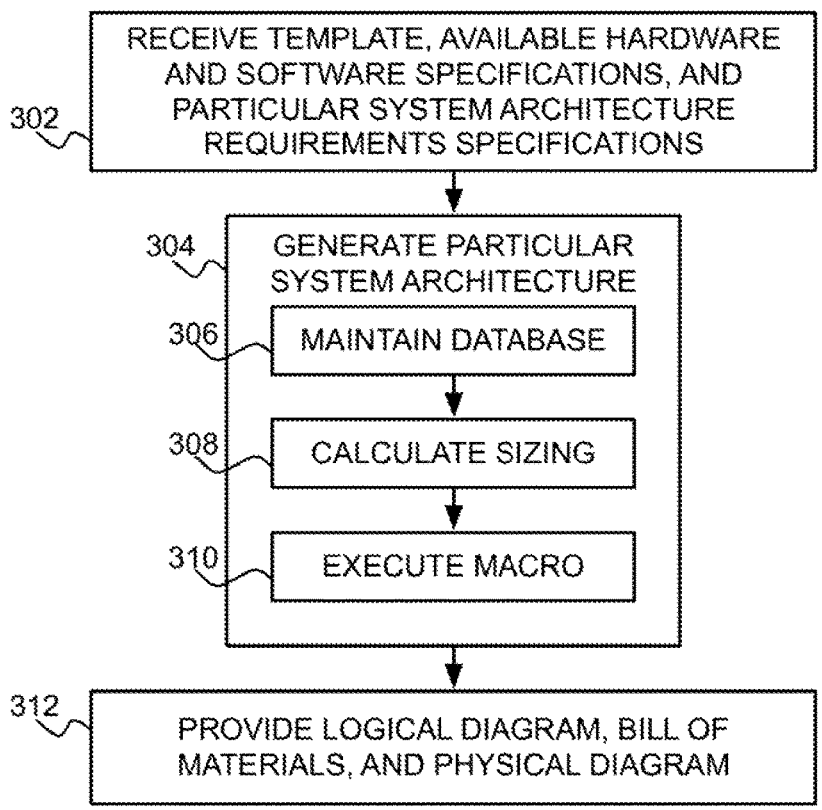
FIGS. 3A and 3B are flowcharts of example methods for generating a particular system architecture.

As noted in the background section, a complex computing system can be implemented using hardware and software from a variety of different vendors, and is constructed as a particular system architecture that is usually developed from the ground up. Such a system architecture is typically developed in a bespoke or custom manner, by a system architect. A system architect is a user who has experience in developing system architectures for a particular desired functionality, which may be colloquially referred to as a solution, or for one or more such desired functionalities. This user receives the requirements of a customer or client for the system, and then goes about determining the architecture for the system and which hardware and which software, from which vendors, should be selected to realize the architecture. This process, however, is labor intensive, and varies depending on the system architect him or herself, as well as his or her skill level, and so on.

Techniques disclosed herein lessen or even avoid these and other problems associated with such bespoke system architecture development, by providing a templatized manner by which a particular system architecture for providing a desired functionality can be developed. A template corresponding to a general system architecture for providing this desired functionality is received, as are specifications of hardware and software that are available to implement the general system architecture to realize the particular system architecture in question. Specifications of the requirements of the particular system architecture are further received, such as from the client or customer for which the particular system architecture is being developed.

Based on these inputs, the particular system architecture for providing the desired functionality is generated. Such generation is specifically based on the template corresponding to the general, system architecture and the requirements of the particular system architecture, where the particular system architecture is implementable using selected hardware and software from the available hardware and software for which specifications have been received. A logical diagram and a physical diagram for the particular system architecture can be output; the former provides a functional view of the particular system architecture, whereas the latter provides a view of how the selected hardware and software are interconnected to one another to realize this functional view. A bill of materials of this hardware and software that has been selected to implement the particular system architecture can also be output. Such output assists in the ordering and acquisition of components and other materials to build the particular system, and also assists in performing a costing exercise to forecast how much the potential cost of such components and other materials will be.

FIG. 1 illustratively depicts example operation 100 as to how a particular system architecture for providing a desired functionality can be generated. There are inputs 102 and outputs 104 to a tool 106, the latter which is described in more detail later in the detailed description. The tool 106 can be iterative, as indicated by iteration 108. This iteration 108 permits differently sized particular systems to be developed during a "what if" analysis and/or for a sales cycle to confirm the sizing for a particular system in satisfaction of client or customer requirements, as is described in more detail later in the detailed description. In general, the tool 106 is one or more computer programs executed on one or more computing devices, and thus may be considered as a software package to implement the functionality described herein, and/or as the computer or other computing device running, such software.

The inputs 102 include one or more general system architecture templates 110, available hardware and software specifications 112, and particular system architecture requirements specifications 114. The general system architecture templates 110 are each directed to a different solution for a general system architecture. That is, each template 110 is for a different general system architecture to provide a different functionality. Examples of such solutions and thus of such different functionalities include, as noted above, digital media management systems, manufacturing systems, business analytics for marketing systems, and so on.

A general system architecture template 110 does not, define a particular system architecture for providing a corresponding functionality, but rather describes and defines in more general terms a sample system architecture that provides this functionality, which can then be modified and populated as appropriate to generate a particular system architecture functionality. A general system architecture template 110 can thus be considered a reference system architecture to provide the functionality in question. The general system architecture template 110 can capture the intelligence of an expert system architect user or users, including the types of best practices, parameters, factors, considerations, and design choices that such a user makes when developing a particular system architecture to provide the functionality. How this can be performed using such a general system architecture template 110 is described later in and throughout the remainder of the detailed description.

The available hardware and software specifications 112 are specifications of the hardware and software available to implement the general system architecture to generate the particular system architecture. In general, the hardware and software delineated in the specifications 112 are selected by the tool 106 to generate the particular system architecture. Not all of the hardware and software listed in the available hardware and software specifications 112 are likely to be used, but rather the most appropriate hardware and software to generate the particular system architecture in question are selected, as is described later in and throughout the remainder of the detailed description.

For each piece or item of hardware and software, the specifications 112 include particular information like the item's vendor, characteristics, and identifying information such as a model or part number and/or a version number. Examples of characteristics may include performance specifications, for instances. Up-to-date cost information may also be provided. In at least some implementations, the hardware and software are not from the same vendor. This provides the disclosed techniques with the ability to "mix and match" products from different vendors to develop an optimal particular system architecture, and is in contradistinction with existing solutions that generally focus on one vendor's products. That is, the hardware and the software can be provided by multiple vendors, such that the particular system architecture is generated in a vendor-neutral manner, without exclusively favoring any particular vendor.

The particular system architecture requirements specifications 114 delineate the requirements for the particular system architecture that is to be generated. The specifications 114 may be obtained by interviewing a client or customer as to his or her entity's needs for the particular system in question, including the desired functionality of the system, and then appropriately input by a system architect user into the tool 105. As one example, the tool 106 may query the system architect user as to the requirements of the particular system architecture, where the answers to these questions constitute the specifications 114.

Such querying may be achieved based on or guided by the general system architecture template 110 for the desired functionality or type of solution specified. As an example, the system architect user may first be asked to select from a number of different functionalities corresponding to the functionalities of the general system architecture templates 110 that are available. Based on this initial selection, the general system architecture template 110 in question may be referenced to determine what other questions to ask the system architect user. The answer to each of at least some of the questions may further govern what other questions are (or are not) asked.

In this respect, the system architect user that provides the answers may have at least some familiarity with system architecture design and development, but is likely to not be an expert system architect user. Therefore, cost savings can be achieved by using the techniques disclosed herein because system architect users of lesser expertise can nevertheless develop particular system architectures akin to those developed by expert system architect users, via usage of the tool 106. A system architect user is guided as to what information (i.e., specifications 114) to provide that is relevant to design and development of the particular system architecture in question.

The particular system architecture requirements specifications 114 can include information such as the various characteristics of the particular system architecture that are contemplated. For instance, the expected number of users that may concurrently use the particular system, the expected throughput of the system, and so on, can be depending on the desired functionality in question be considered as the requirements for the particular system architecture. Bandwidth and other types of parameters and characteristics may also be part of the specifications 114.

The tool 106 generates the particular system architecture for the desired functionality, where this architecture can be considered as being defined by or as the outputs 104, based on the inputs 102 that are provided. An example implementation of the tool 106 is described in detail later in the detailed description. However, in general the tool 106 can be considered as processing the general system architecture template 110 for the selected functionality based on the particular system architecture requirements specifications 114 to select hardware and software from that which is available as indicated by the specifications 112.

The general system architecture template 110 in this respect may provide an example logical and/or physical architecture that the tool 106 modifies, adapts, and/or populates with the available hardware and software, as governed by the requirements specifications 114, as described in more detail later in the detailed description. A logical architecture defines the functionalities that various logical processing blocks perform, as well as how such blocks are interconnected with one another, to provide the desired functionality to which the general template 110 in question corresponds. By comparison, the physical architecture specifies the physical hardware and software, and how they are interconnected, to achieve or effectuate the logical architecture. Thus a general system architecture template can be considered as 'empty,' implying it is referential in nature but is not something that is put to practical usage. The general system architecture template 110 may, for instance, include the rules by which its empty or referential nature is to be modified by processing in accordance to the requirements specifications 114. Upon such processing a particular architecture is generated. In contrast to the 'empty' nature of the general architecture the particular architecture is a version of the general system architecture template that has been 'filled out' and intended to be put to practical usage to meet the requirements specifications 114. Processing logic that is general to the general system architecture templates 110 as a whole may thus be built into the tool 106 itself, and processing logic that is particular to a given system architecture may be provided by the general template 110 for this architecture.

As noted above, the particular system architecture for the desired functionality that the tool 106 generates is defined by the outputs 104. The outputs 104 can include a logical diagram 116 of the particular system architecture, a bill of materials 118 of the selected hardware and software, and a physical diagram 120 of the particular system architecture. Each of these different outputs 104 is now described in more detail.

The logical diagram 116 of the particular system architecture depicts functionally how the particular system architecture is implemented. As such, the hardware and software selected to implement the particular system architecture are not specified in the logical diagram 116, nor how such selected hardware and software are interconnected and relate to one another. Rather, the logical diagram 116 provides the system architect user, as well as the client or customer, with a view as to how the particular system architecture works, without complicating the view with exact details as to the hardware and the software used to implement the functionality.

For instance, the logical diagram 116 may include functional or logical blocks that represent functionality or operations that are performed, as opposed to the hardware and software that implement these blocks. Indeed, a given block may be implemented over a number of different pieces of hardware and software. Similarly, a given combination of hardware and software may implement more than one block.

The bill of materials 118 of the selected hardware and software is a list of the hardware and the software that the tool 106 has selected, from the available hardware and software delineated within the specifications 112 thereof. The bill of materials 118 can specify each item or piece of hardware and software as a separate line item, including the quantity thereof, the vendor, characteristics of the item, and identifying information like model number, version number, and so on, among other types of information. Per-unit and total price may also be provided. The bill of materials 118 thus permits the system architect user and/or the client or customer with an understanding of the software and hardware that the particular system architecture developed will use, and how much it may cost to procure these items.

The physical diagram 120 of the particular system architecture depicts how the hardware and software selected to implement the particular system architecture are interconnected and relate to one another, without necessarily depicting functionally how the particular system architecture is implemented. In that respect, the physical diagram 120 may be considered as the counterpart of the logical diagram 116. The physical diagram does not depict what the various software and hardware "do," but rather, how they are interconnected and relate to one another. For example, the physical diagram 120 may specify a network switch may be connected to a number of different servers, each of which run various software, and so on.

From the outputs 104, the system architect user thus has a complete definition of the particular system architecture for the desired functionality that the tool 106 has generated. The user can glean how the particular system architecture works by reviewing the logical diagram 116. The user can learn what software and hardware is used to implement this architecture by analyzing the bill of materials 118. The user can determine how this software and hardware is connected and relates to one another by inspecting the physical diagram 120.

In one implementation, the particular system architecture development process that has been described may be iterative. For example, a system architect user and/or the client or customer may want to learn how the architecture is impacted if the architecture were sized differently. As such, the tool 106 can provide for iteration 108, to permit such a user to perform various "what if"-type analyses on the particular system architecture that is undergoing development. Furthermore, the tool 106 can be fine-tuned based on monitoring information of the particular system architecture upon actual implementation thereof, so that the architecture can be upgraded, updated, and so on.

Specifically, another input to the tool 106 can include sizing and monitoring variables 122. The sizing variables may be provided during the initial querying of the system architect user to obtain the particular system architecture requirements specifications 114, at least initially. Thereafter, as iterations are performed to size the system up or down—i.e., to provide the architecture with more or less capability in terms of number of users, bandwidth, throughput, and so on, as particular examples of such sizing variables—the sizing variables may be separately input into the tool 106, or automatically generated. For instance, the sizing variables can be automatically generated by monitoring the particular system architecture in operation.

The tool 106 therefore can be considered as outputting differently sized particular system architectures 124. The tool 106 may provide for an initially sized such architecture 124 as defined by the outputs 104, where each successive iteration results in another version or different size of the particular system architecture 124 in question. The feedback loop from these architectures 124 to the sizing and monitoring variables 122 can be two-fold. First, prior to implementation of any particular system architecture 124, the sizing variables themselves can be modified to be different than that which resulted in the previously generated system architecture or architectures 124. Such a feedback loop is a "what if" analysis, which is performed before any given particular system architecture 124 that is generated is actually implemented.

Second, once a generated particular system architecture 124 is actually implemented, the real instantiation thereof can have its performance monitored. For example, although the particular system architecture 124 in question may have been generated to accommodate a certain number of users, provide a certain throughout, and so on, in actuality the architecture 124 may provide more or less performance. Such monitoring variables—i.e., actual performance characteristics like speed, response time, bandwidth, and so on—can be fed back into the tool 106, so that the particular system architecture 124 can be tweaked to provide more accurate performance in relation to the particular system architecture requirements specifications 114.

For example, if the actual performance is slower than expected, this information can be iteratively introduced into the tool 106, which can use this information to update the particular system architecture 124 with more resources so that performance is as expected. Similarly, if the actual performance is faster than expected, this information can be reintroduced into the tool 106 to update the particular system architecture 124 with fewer resources so that the architecture 124 costs less to implement while still satisfying desired performance specifications. The iteration 108, then, ultimately provides for hypothetical "what if" analyses to be performed prior to implementation of a generated particular system architecture 124, as well as fine-tuning of the architecture 124 after implementation thereof.

FIG. 2 shows an example system 200 that can perform the operation 100 of FIG. 1 that has been described to generate a particular system architecture for providing a desired functionality. The system 200 can be implemented over one or more computing devices, such as desktop computers, laptop computers, and so on. The system 200 includes at least a computer-readable data storage medium 202 and a processor 204. The system 200 can and typically will include other hardware components as well.

The computer-readable data storage medium 202 can include one or more of volatile memory like dynamic random-access semiconductor memory, and non-volatile memory such as hard disk drives, solid state drives, and the like. The computer-readable data storage medium 202 stores data representing a database 206, as well as data representing a particular system architecture 208 that is generated within the system 200. The computer-readable data storage medium 202 also stores data representing the particular system architecture specifications 114 that have been described, and a computer program 210, which may in actuality be one or more such computer programs, and which implements the tool 106 that has been described. The processor 204 executes the computer program 210 from the computer-readable data storage medium 202.

The database 206 can include two database tables 212 and 214. The database table 212 stores the general system architecture templates 110, where one such template 110 is depicted in detail in FIG. 2. The database table 214 stores the available hardware and software specifications 112 that have been described, and can also store drawings 216 that represent each such piece of hardware and software, such as a logical illustration and/or a physical illustration thereof. The drawings 216 can in other implementations be stored in a different database table of the database 206 or a different database, or may be stored external to a database, where in such instances the available hardware and software specifications 112 include references to the drawings 216 on a per-hardware and software item basis. It is further noted that the database tables 212 and 214 can each be more generally considered as a schema that includes more than one specific database table including information such as rules, questions, hardware and software specifications and so on.

For each template 110 stored within the database table 212, the table 212 stores hardware and software specifications 218 of the hardware and software that can be used to implement the general system architecture to which the template 110 in question corresponds. The hardware and software specifications 218 are specifically references or links to the available hardware and software specifications 112 within the database table 214, such that there are mappings between the database table 212 and the database table 214. Representing the hardware and software specifications 218 of each template 110 as links to the database table 214 reduces storage requirements of the database 206, because duplication of these specifications within different templates 110 that correspond to general system architectures that can be implemented with the same pieces of hardware and software is avoided.

The database table 212 can store for each template 110 questions 220 that the tool 106 uses to generate the particular system architecture requirements specifications. In this respect, once a particular desired functionality or solution is selected, the tool 106 can load the corresponding template 110 and use the questions 220 thereof to ask a system architect user, the answers to which constitute the particular system architecture requirements specifications 114. In such an implementation, then, although the requirements specifications 114 are indeed inputs to other parts of the tool 106, the tool 106 also generates the specifications 114 themselves based on answers to the questions 220 provided by the system architect user.

The database table 212 stores for each template 110 rules 222 and/or macros 224 that the tool 106 uses to generate the particular system architecture 208 for the desired functionality to which the template 110 corresponds. That is, the rules 222 and the macros 224 together are used to generate the particular system architecture 208. The rules 222 may be formatted in accordance with a predefined language, such as a scripting language, or as even more simple if-then rules. The macros 224 can be macros executable by a spreadsheet program. More generally, the macros 224 are formulas or other mechanisms that encapsulate calculations and principles by which the particular system architecture 208 can be generated, and do not have to be particular to (i.e., executed by) a spreadsheet program.

The rules 222 may be geared or adapted towards generating the particular system architecture 208 itself, whereas the macros 224 may be geared or adapted towards then adjusting the sizing of this generated particular system architecture 208 depending on sizing and monitoring variables. That is, the rules 222 may be executed to determine which types of hardware and software the particular system architecture 208 should include, and how such hardware and software interrelate to one another. By comparison, the macros 224 may be executed to appropriately size and otherwise fine-tune the hardware and software selected and connected to accommodate a particular capacity of the architecture 208.

The computer program 210 that implements the tool 106 can include a query module 224. The query module 224 retrieves for a selected template 110 the questions 220 thereof stored within the database table 212, and asks the system architect user the questions 220 to generate, determine, or learn the particular system architecture requirements specifications 114. The query module 224 can initially ask the user the type of solution or desired functionality for which the particular system architecture 208 is to be generated, and on this basis then select the appropriate template 110 stored within the database table 212.

The computer program 210 can include a generation module 226. The generation module 226 generates the particular system architecture 208, based on the particular system architecture requirement specifications 114, using the rules 222 and/or the macros 224 that have been described. As such, the generation module 226 retrieves the hardware and software specifications 218 of the template 110, and selects which hardware and software should be used within the particular system architecture 208 by, for instance, applying the rules 222 in particular to the requirements specifications 114.

The computer program 210 can include a capacity module 228. The capacity module 228 adjusts the particular system architecture 208 that the generation module 226 has generated to provide the sizing of various hardware and software that the generation module 226 has selected for the particular system architecture 208. The capacity module 228 can also be invoked during subsequent iteration of the particular system architecture 208, based on sizing and monitoring variables as have been described, to subsequently fine-tune, tweak, or readjust the sizing of the architecture 208. The capacity module 228 may perform its functionality, for instance, by specifically executing the macros 224.

In this respect, the generation module 226 and the capacity module 228 work in unison to at least some extent. The generation module 226 generates the overall layout and initial population thereof for the particular system architecture 208, and the capacity module 228 then fine-tunes or sizes the resulting system architecture 208 to more completely define the architecture 208. The base general system architecture itself—on which basis the modules 226 and 228 together generate the particular system architecture 208—is encapsulated by the template 110, which the rules 222 and/or the macros 224 then act on to generate the particular system architecture 208.

The logic that the computer program 210 performs via the modules 226 and 228 may be partially encapsulated within the modules 226 and 228 themselves. Such logic is the common logic that is generally applicable to the templates 110 and their corresponding general system architectures as a whole. Specific logic that pertains to a given general system architecture is by comparison contained within the rules 222 and/or the macros 224 of the template 110 for this given architecture. The common logic pertaining to the general system architectures as a whole or as a group may also be overruled by the specific logic for a given general system architecture in some implementations.

The computer program 210 can include a bill of materials module 230. The bill of materials module 230 generates the bill of materials 118 that is part of the definition of the particular system architecture 208. The bill of materials module 230 takes the particular system architecture 208 that the generation module 226 and the capacity module 228 have generated and sized, and references the available hardware and software specifications 112 within the database table 214 to generate detailed information for each hardware and software item used within the architecture 208.

The computer program 210 can include a diagram module 232. The diagram module 232 generates the logical diagram 116 and the physical diagram 120 that are also part of the definition of the particular system architecture 208. The diagram module 232 takes the particular system architecture 208 that the generation module 226 and the capacity module 228 have generated and sized, and generates the logical diagram 116 to illustratively depict the functional relationships and blocks encased within the architecture 208. If non-generic illustrative elements are used to represent such relationships and/or blocks, the diagram module 232 may refer to the database 206 to retrieve such information, such as via accessing the drawings 216 as referenced by or stored within the database table 214.

The diagram module 232 similarly takes the particular system architecture 208 that the generation module 226 and the capacity module 228 have generated and sized, and/or the logical diagram 116 and the bill of materials 118, to generate the physical diagram 120. The physical diagram 120 illustratively depicts representations of the actual hardware and software used to implement the particular system architecture 208, and how such hardware and software are interconnected and/or are interrelated, as noted above. The diagram module 232 references the drawings 216 through the database table 212 and/or the database table 214 of the database 206 and retrieves the appropriate drawings 216 that illustratively represent this hardware and soft are and their interconnectivity-related information.

The computer program 210 may include a management module 234. A system architect user, or another user such as an administrator or maintainer of the tool 106 and/or the database 206, uses the management module 234 to update the database 206. The database 206 may be updated to add, remove, or modify templates 110, to adjust the available hardware and software specifications 112, to add, remove, or modify drawings 216, and so on.

As noted above, the computer program 210 may in actuality be more than one such computer program. The modules 224, 226, 228, 230, 232, and 234 that have been described may be implemented as separate computer programs, as separate collections of computer programs, as components, software objects, routines, or other sections of code of the same or different computer programs, and so on. For example, the query module 224 may be constructed as a graphical user interface component using an existing software package for developing such components. The generation module 226 may be a scripting engine that can parse and execute a script, whereas the capacity module 228 may be a spreadsheet program or an application thereof. The bill of materials module 230 may similarly be implemented via a spreadsheet program or may be a software application module by itself, whereas the diagram module 232 may be implemented as a macro for, or as a diagramming or drawing program. The management module 234 may be a front end for a database program that maintains the database 206.

Figure 3B:
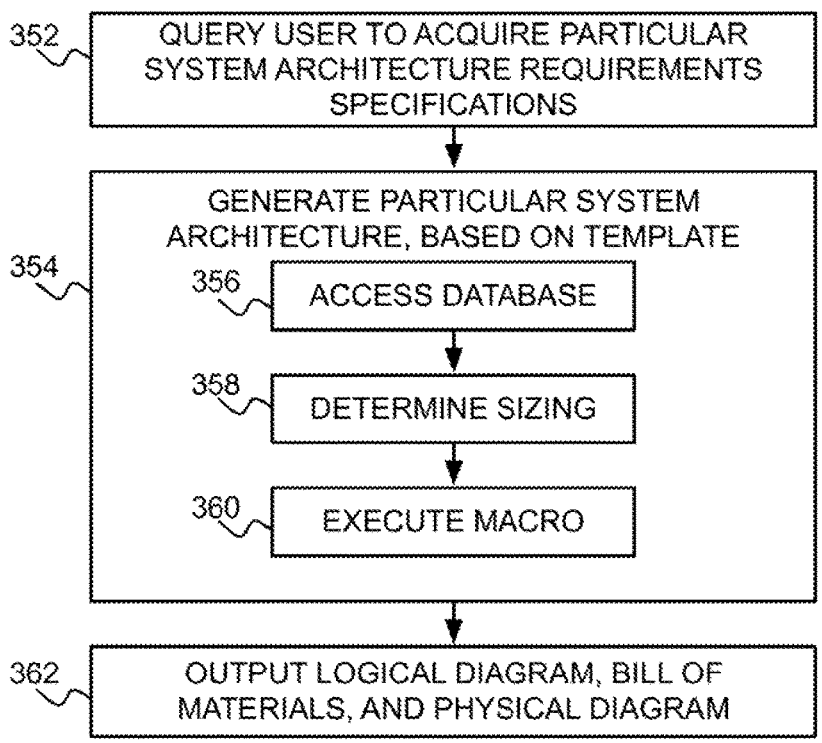

FIGS. 3A and 3B show example methods 300 and 350, respectively, for generating the particular system architecture 208 in relation to the operation 100 and the system 200 that have been described. The methods 300 and 350 are consistent with one another, but are slightly different from one another. Further, parts of the method 300 can be employed within the method 350, parts of the method 350 can be employed within the method 300, and other adaptations to the methods 300 and 350 can be made in various implementations. The methods 300 and 350 can each be implemented as one or more computer programs stored on a non-transitory computer-readable data storage medium and executable by a processor. For instance, the methods 300 and 350 can be implemented as the computer program 210 that itself implements the tool 106, and which is executed by the processor 204 from the computer-readable data storage medium 202.

In the method 300 of FIG. 3A, one or more general system architecture templates 110, available hardware and software specifications 112, and particular system architecture requirement specifications 114 are received (302). As noted above, the templates 110 include a specific template 110 that will be used to generate the particular system architecture 208. A system architect user can select from various solutions or predetermined functionalities to which the templates 110 correspond, which results in selection of the specific template 110 providing the selected solution or desired predetermined functionality. As also noted above, the particular system architecture requirement specifications 114 can be in essence received by querying a system architecture user as to the requirements of the particular system architecture by asking this user questions based on the specific template 110, where answers to these questions constitute the specifications 114.

The method 300 continues by generating the particular system architecture 208 (304). As noted above, such generation can include maintaining a database 206 (306) that has a database table 212 storing the general system architecture templates 110, and a database table 214 storing at least the available hardware and software specifications 112, where the table 212 is mapped or linked to the table 214. Such generation can include, as noted above, calculating the sizing of the particular system architecture 208 based on the requirements specifications (114), and executing a macro 224, such as a spreadsheet macro, to generate the particular system architecture 208 (116), including the diagrams 116 and 120 and the bill of materials 118. The method 300 concludes by providing one or more of the logical diagram 116, the bill of materials 118, and the physical diagram 120 (312), such as by outputting the diagrams 116 and 120 and the bill of materials 118 for review by a user.

In the method 350 of FIG. 3B, a user, such as a software architect user, is queried to acquire the particular system architecture requirements specifications 114 (352). As noted above, such querying can include asking this user questions based on the specific template 110 for the desired functionality that the particular system architecture 208 is to provide, where the answers to these questions constitute the requirements specifications 114. The method 350 continues by then generating the particular system architecture 208 (354), based on the specific template 110, where such generation includes selecting the hardware and software to implement the particular system architecture 208 from the available hardware and software specifications 112.

For instance, the database 206 including the database tables 212 and 214 can be accessed (356). Sizing of the particular system architecture can be determined (358), based on the particular system architecture requirements specifications 114. A macro 224 of the specific template 110 can be executed based on the sizing of the particular system architecture 208 that has been calculated, and using the database 206, to generate the diagrams 116 and 120 and the bill of materials 118 (360). The method concludes by outputting one or more of the logical diagram 116, the bill of materials 118, and the physical diagram 120 (362), as described above.

The techniques disclosed herein thus permit a user to more easily generate a particular system architecture for providing a predetermined and desired functionality. Such an architecture is likely to be more standardized regardless of the user who employs the tool 106, as compared to in the conventional scenario in which a given user crafts a custom, bespoke particular system architecture that may vary greatly depending on the user tasked with this job. Furthermore, the techniques disclosed herein are likely to provide for faster and more cost effective particular system architecture generation than as compared to crafting individual custom particular system architectures from the ground-up as is conventionally performed.

We claim:

1. A method comprising:
receiving, by a processor of a computing device, a template corresponding to a general system architecture for providing a desired functionality, specifications of hardware and software available to implement the general system architecture, and specifications of requirements of a particular system architecture for providing the desired functionality;
generating, by the processor, the particular system architecture for providing the desired functionality, based on the template and the requirements, the particular system architecture implementable using the hardware and the software, wherein generating the particular system architecture comprises:
maintaining a database having a first database table of the specifications of the hardware and the software available to implement the general system architecture, and a second database table corresponding to the template, the second database table relationally linking to the first database table;
calculating sizing of the particular system architecture based on the specifications of the requirements of the particular system architecture; and
executing a macro corresponding to the template, based on the sizing of the particular system architecture that has been calculated, to generate a logical diagram of the particular system architecture, a bill of materials of the hardware, and a physical diagram of the particular system architecture, wherein executing the macro accesses and uses the database;
outputting, by the processor, the logical diagram of the particular system architecture depicting functionally how the particular system architecture is implemented, the physical diagram of the particular system architecture depicting how the hardware and software selected to implement the particular system architecture are interconnected, and the bill of materials that specifies each item of the hardware and the software selected to implement the particular system architecture; and
implementing, by the processor, the particular system architecture to determine that the selected hardware and software provide the desired functionality.

2. The method of claim 1, wherein the template is a specific template and receiving the template comprises receiving a plurality of different templates corresponding to different general system architectures for providing different desired functionalities, the different templates including the specific template, and
wherein generating the particular system architecture comprises matching the desired functionality of the particular system architecture to the desired functionality of the specific template among the different desired functionalities of the different templates.

3. The method of claim 1, wherein receiving the specifications of the hardware and the software available to implement the general system architecture comprises receiving for each of the hardware and the software, as an item, a vendor of the item, characteristics of the item, and one or more of a model number and a version of the item.

4. The method of claim 3, wherein the hardware and the software are provided by multiple vendors, such that generating the particular system architecture is performed in a vendor-neutral manner, without exclusively favoring any particular vendor.

5. The method of claim 1, wherein receiving the specifications of the requirements of the particular system architecture comprises querying a system architect user as to the requirements of the particular system architecture by asking the system architect user a plurality of questions based on the template, answers to the questions constituting the specifications of the requirements.

6. The method of claim 1, wherein outputting the logical diagram of the particular system architecture comprises providing a diagram depicting functionally how the particular system architecture is implemented, without depicting how the hardware and the software selected to implement the particular system architecture are interconnected and relate to one another.

7. The method of claim 1, wherein outputting the physical diagram of the particular system architecture comprising providing a diagram depicting how the hardware and the software selected to implement the particular system architecture are interconnected and relate to one another, without depicting functionally how the particular system architecture is implemented.

8. The method of claim 1, wherein outputting the bill of materials that specifies each item of the hardware and the software selected to implement the particular system architecture comprises providing a list including for each of the hardware and the software, as an item, a quantity of the item, a vendor of the item, characteristics of the item, and one or more of a model number and a version of the item.

9. The method of claim 1, wherein implementing the particular system architecture includes:
performing successive iterations to implement the particular system architecture with different sizes of a specific variable of the particular system architecture; and
generating different versions of the particular system architecture having different capabilities based on the different sizes of the specific variable.

10. A non-transitory computer-readable data storage medium storing instructions that when executed by a processor of a computing device cause the processor to:
query a user to acquire specifications of requirements of a particular system architecture for providing a desired functionality;
generate the particular system architecture for providing the desired functionality, based on the requirements, a template corresponding to a general system architecture for providing the desired functionality, and hardware and software selected to implement the particular system architecture, wherein to generate the particular system architecture for providing the desired functionality, the instructions are to cause the processor to:
access a database having a first database table of the specifications of the hardware and the software available to implement the general system architecture, and a second database table corresponding to the template, the second database table relationally linking to the first database table;

determine sizing of the particular system architecture based on the specifications of the requirements of the particular system architecture; and execute a macro corresponding to the template, based on the sizing of the particular system architecture that has been determined, and use the database to generate a logical diagram of the particular system architecture, a bill of materials of the hardware, and a physical diagram of the particular system architecture;

output the logical diagram of the particular system architecture depicting functionally how the particular system architecture is implemented, the physical diagram of the particular system architecture depicting how the hardware and software selected to implement the particular system architecture are interconnected, and the bill of materials that specifies each item of the hardware and the software selected to implement the particular system architecture; and implement the particular system architecture to determine that the selected hardware and software provide the desired functionality.

11. The non-transitory computer-readable data storage medium of claim 10, wherein to query the user to acquire the specifications of the requirements of the particular system architecture, the instructions are to cause the processor to: display a plurality of questions based on the template, and receive answers to the questions constituting the specifications of the requirements.

12. The non-transitory computer-readable data storage medium of claim 10, wherein to implement the particular system architecture, the instructions are to cause the processor to:

perform successive iterations to implement the particular system architecture with different sizes of a specific variable of the particular system architecture; and generate different versions of the particular system architecture having different capabilities based on the different sizes of the specific variable.

13. The non-transitory computer-readable data storage medium of claim 10, wherein the instructions cause the processor to store the first data as the first database table, and store the second data and the third data as the second database table to which the first database table is relationally mapped.

14. The non-transitory computer-readable data storage medium of claim 10, wherein the specifications of requirements of a particular system architecture queried to a user include specifications for each of the hardware and the software, as an item, a vendor of the item, characteristics of the item, and one or more of a model number and a version of the item.

15. The non-transitory computer-readable data storage medium of claim 10, wherein to output the logical diagram, the instructions are to cause the processor to output the logical diagram as a first diagram depicting functionally how the particular system architecture is implemented, without depicting how the hardware and the software selected to implement the particular system architecture are interconnected and relate to one another.

16. The non-transitory computer-readable data storage medium of claim 10, wherein to output the physical diagram, the instructions are to cause the processor to output the physical diagram as a second diagram depicting how the hardware and the software selected to implement the particular system architecture are interconnected and relate to one another, without depicting functionally how the particular system architecture is implemented.

17. The non-transitory computer-readable data storage medium of claim 10, wherein to output the bill of materials, the instructions are to cause the processor to output the bill of materials as a list including for each of the hardware and the software, as an item, a quantity of the item, a vendor of the item, characteristics of the item, and one or more of a model number and a version of the item.

18. A system comprising:
a processor; and
a computer-readable data storage medium storing:
first data representing a template corresponding to a general system architecture for providing a desired functionality;
second data representing specifications of hardware and software available to implement the general system architecture;
third data representing specifications of requirements of a particular system architecture for providing the desired functionality; and
a computer program executable by the processor to:
access a database having a first database table of the specifications of the hardware and the software available to implement the general system architecture, and a second database table corresponding to the template, the second database table relationally linking to the first database table;
determine sizing of the particular system architecture for providing the desired functionality, based on the template and the requirements, including selecting the hardware and the software by which the particular system architecture is implementable; and
execute a macro corresponding to the template, based on the sizing of the particular system architecture, and use the database to generate one or more of a logical diagram of the particular system architecture, a physical diagram of the particular system architecture, and a bill of materials of the hardware and the software selected to implement the particular system architecture.

19. The system of claim 18, wherein the computer-readable data storage medium stores the first data as a first database table of a database and the second data and the third data as a second database table to which the first database table is relationally mapped.

20. The system of claim 18, wherein the computer program is to cause the processor to:
perform successive iterations to implement the particular system architecture with different sizes of a specific variable of the particular system architecture; and
generate different versions of the particular system architecture having different capabilities based on the different sizes of the specific variable.

* * * * *